Dec. 5, 1967 J. A. GEURST ET AL 3,357,005

MULTIPLE MAGNETIC HEAD ASSEMBLY

Filed Feb. 18, 1965

INVENTORS
JAN A. GEURST
GEORGE L. WALTHER
BY
Frank R. Trifari
AGENT 3,357,005
MULTIPLE MAGNETIC HEAD ASSEMBLY Jan Albert Geurst and George Ludwig Walther, Emmasingel, Eindhoven, Netherlands, assignors to North American Philips Company Inc., New York, N.Y., a corporation of Delaware Filed Feb. 18, 1965, Ser. No. 433,685
Claims priority, application Netherlands, Feb. 29, 1964, 64—2,501
3 Claims. (Cl. 340—174.1)

Figure 1:
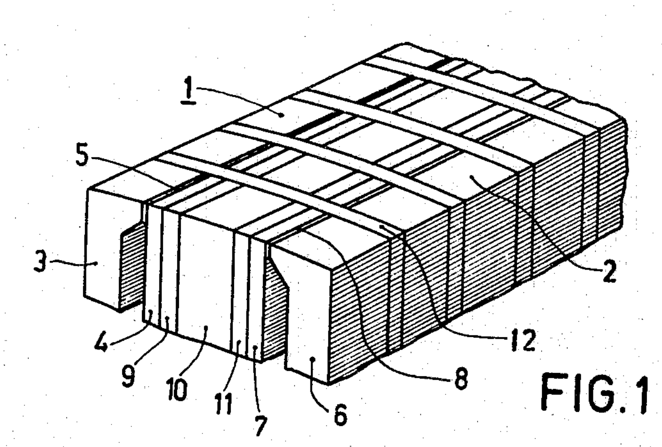

This invention relates to magnetic heads and particularly to devices for reducing or obviating the relative influence between parts of a multiple magnetic head. Multiple magnetic heads for recording an reproducing one or more parallel records on a carrier provided with magnetisable material are usually constructed of at least two interconnected magnetic circuits lying one after the other, each consisting of at least two portions of sintered, oxidic, ferromagnetic material. Between the two portions is positioned a useful gap, filled out with non-magnetisable material, which, in addition, affixes the two portions to each other. Between the magnetic circuits including the gap, at least one plate of sintered, oxidic, ferromagnetic material is positioned, and between an individual circuit and a plate of sintered, oxidic, ferromagnetic material, a plate of electrically conducting, non-magnetisable material is positioned. With such a magnetic head the influence of the recording circuit on the reproducing circuit is already very small and also conversely, the influence of the reproducing circuit on the recording circuit is strongly reduced as compared with a conventional magnetic head not provided with said plates.

Elaborate calculations, the results of which have been corroborated by extensive experiments, have shown that it is possible to further reduce said relative influence or to obviate it substantially completely. In accordance with the invention, a device for reducing or obviating the relative influence of parts of a magnetic head of the kind set forth is characterized in that means are present for imparting to the plate of sintered, oxidic, ferromagnetic material and as far as possible equal magnetic potential relative to that of the upper face of that portion of the recording circuit, which is located on the outer side of the head.

The said potential of the plate may be obtained in various ways. In a given embodiment of the invention the plate of electrically conducting, non-magnetisable material located between the recording circuit and the plate of sintered, oxidic, ferromagnetic material is provided with a preferably adjustable interruption. This provides a simple magnetic coupling.

It is also possible, according to another embodiment of the invention, to provide a plate of sintered, oxidic, ferromagnetic material which is preferably adjustable and located on the side of the recording circuit remote from the carrier and which is disposed both opposite to at least part of the plate of sintered, oxidic, ferromagnetic material and opposite to at least part of the recording circuit. From the manufacturing point of view the latter embodiment is simpler and cheaper, since the head structure proper need not be modified.

Figure 2:
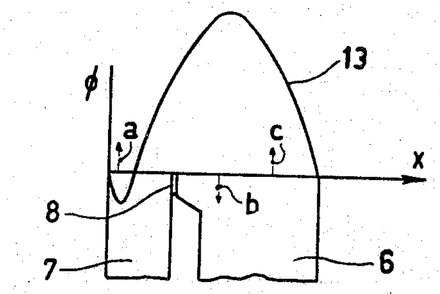
Figure 3:
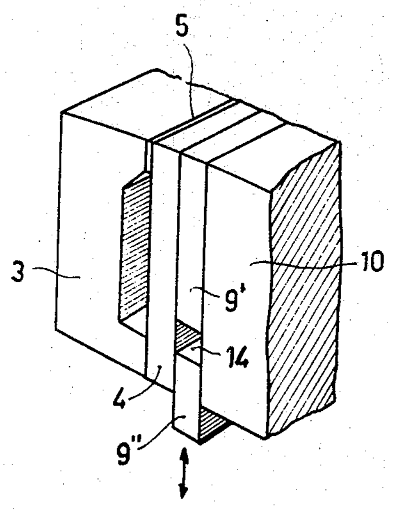
Figure 4:
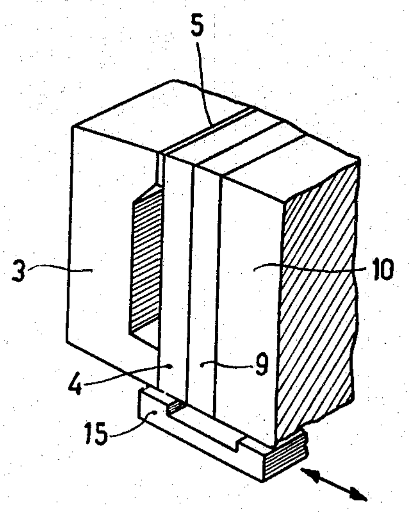

The invention will be explained with reference to the drawing, which shows, by way of example, a few embodiments of the invention and in which:

FIG. 1 shows diagrammatically and isometrically a side elevation of a multiple magnetic head, FIG. 2 is a graph of the magnetic flux in the reproducing circuit of the head shown in FIG. 1, FIG. 3 shows diagrammatically a construction for reducing or eliminating the relative influence of the various magnetic circuits, and FIG. 4 shows a further structure for the same purpose.

FIG. 1 shows a multiple magnetic head which consists of a number of recording circuits 1 and a number of reproducing circuits 2. Each recording circuit has a pole piece 3 and a pole piece 4 of sintered, oxidic, ferromagnetic material. Between the pole pieces 3 and 4 there is provided a useful gap 5 filled out with non-magnetisable material, for example, glass, which affixes the parts 3 and 4 to each other. Each reproducing circuit also has two pole pieces 6 and 7 of sintered, oxidic, ferromagnetic material, having in between them a gap 8 filled out with non-magnetisable material, for example glass, which also affixes the parts 6 and 7 to each other.

Between each recording circuit and reproducing circuit there is provided an assembly of plates comprising a plate 9 of electrically conducting material, for example silver, a plate 10 of sintered, oxidic, ferromagnetic material and a plate 11 also electrically conducting material, for example silver. Each unit is separated from the adjacent unit by a metal plate 12.

In practice it is found that, if, for example, owing to excitation the pole piece 4 is at a positive magnetic potential, the plate 10 is also at a positive magnetic potential in spite of the assembly of plates 9, 10 and 11, so that the reproducing circuit 6, 7 can be affected by the recording circuit 3, 4.

FIG. 2 shows the magnetic flux distribution across the reproducing circuit 6, 7. The curve 13 indicates the value of said flux with respect to the over-all length of said circuit in the direction of movement of the carrier. According to the arrow *a* there is a flux stream quite near the edge of the circuit directed towards the central screen 10. The curve then bends to pass through a zero point, after which it rises sharply. In this portion *b* there is a magnetic flux stream from the positive pole piece of the recording circuit 3, 4. Finally the curve drops sharply. In this portion, indicated by the arrow *c*, there is a magnetic flux stream towards the negative pole piece of the recording circuit 3, 4. If it were possible to cause the useful gap 8 to coincide with the place of the zero point of the curve, the influence of the reproducing circuit on the recording circuit could be completely compensated. However, this can be obtained in practice only with difficulty. A very near compensation may, however, be attained by providing on the screen 10 a magnetic potential as far as possible equal to that of the upper face of that portion of the recording circuit (3, 4) which is located on the outer side of the head assembly, in this case, portion 3.

This equal magnetic potential of the plate 10 may be obtained by providing, as is shown in FIG. 3, the electrically conducting screen 9 in two portions $9^{I}$ and $9^{II}$, there being left an opening 14 between said portions. The portion $9^{II}$ is displaceable in two directions. A positive magnetic potential in the plate 10 will produce a magnetic flux towards the pole piece 4 through the opening 14, so that the sharply rising part of the curve 13 drops to a much lower level or disappears substantially completely.

A given magnetic potential of the plate 10 may also be obtained as is shown in FIG. 4, by providing a magnetic short-circuit 15 between the plate 10 and the recording circuit 3, 4.

The plate 15 is made of sintered, oxidic, ferromagnetic material and is displaceable in two directions indicated by the arrows, so that in practice the correct adjustment can be easily obtained and the influence of the recording circuit 3, 4 on the reproducing circuit 6, 7 can be minimized or be eliminated.

What is claimed is:

1. A device for reducing or eliminating the relative influence of the parts of a multiple magnetic head for recording and reproducing one or more parallel records on a carrier provided with magnetisable material, said head consisting of at least two interconnected magnetic circuits, one for recording and one for reproducing, lying one after the other and consisting each of at least two portions of sintered, oxidic, ferromagnetic material, there being provided between said two portions a useful gap filled out with non-magnetisable material, said non-magnetisable material bonding the two portions to each other, at least one plate of sintered, oxidic, ferromagnetic material arranged between the magnetic circuits, a plate of electrically conducting, non-magnetisable material arranged between each individual magnetic circuit and a plate of sintered, oxidic, ferromagnetic material, and means for imparting to the plate of sintered, oxidic, ferromagnetic material a magnetic potential which is substantially equal to that portion of the recording circuit which is located on the outer side of the head.

2. A device as claimed in claim 1, wherein an adjustable interruption is provided in that plate of electrically conducting, non-magnetisable material which is located between the recording circuit and the plate of sintered, oxidic, ferromagnetic material.

3. A device as claimed in claim 1, wherein a plate of sintered, oxidic, ferromagnetic material is adjustably located on the side of the recording circuit remote from the carrier, said plate being disposed both opposite to at least part of the plate of sintered, oxidic, ferromagnetic material and opposite to at least part of the recording circuit.

References Cited

UNITED STATES PATENTS

| | | | |
|---|---|---|---|
| 3,249,928 | 5/1966 | Curtis et al. | 179—100.2 |
| 3,132,214 | 5/1964 | Welsh | 340—174.1 |
| 3,064,333 | 11/1962 | Kristiansen et al. | 340—174.1 |
| 2,922,231 | 1/1960 | Witt et al. | 340—174.1 |

BERNARD KONICK, *Primary Examiner.*

A. I. NEUSTADT, *Assistant Examiner.*